July 26, 1949.  F. L. FAHY  2,477,242
METHOD OF MAKING BOURDON TUBE INSTRUMENTS
Filed July 8, 1946  2 Sheets-Sheet 1

Inventor
Francis L. Fahy
by Roberts Cushman & Grover
Att'ys.

July 26, 1949.                    F. L. FAHY                    2,477,242
                    METHOD OF MAKING BOURDON TUBE INSTRUMENTS
Filed July 8, 1946                                          2 Sheets-Sheet 2
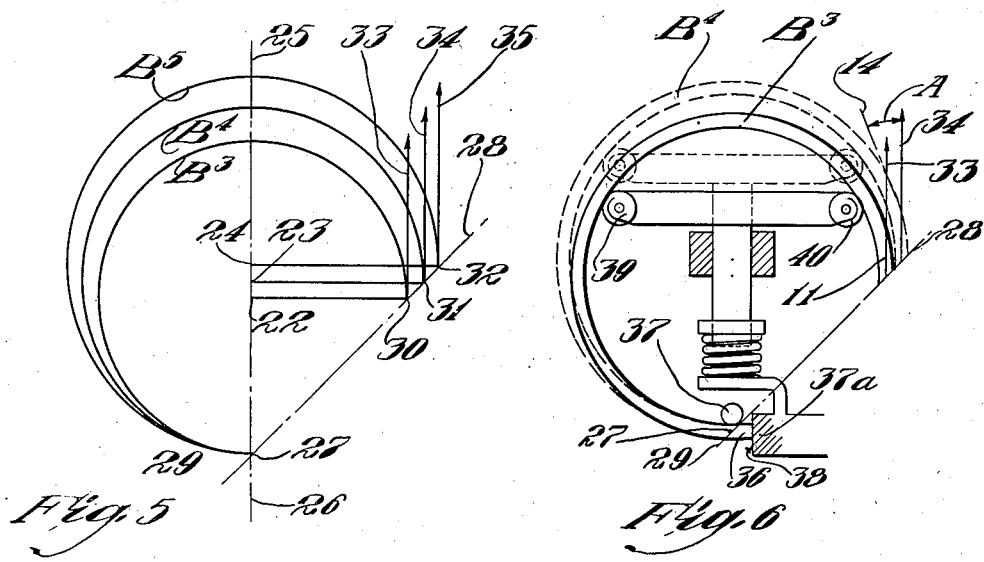
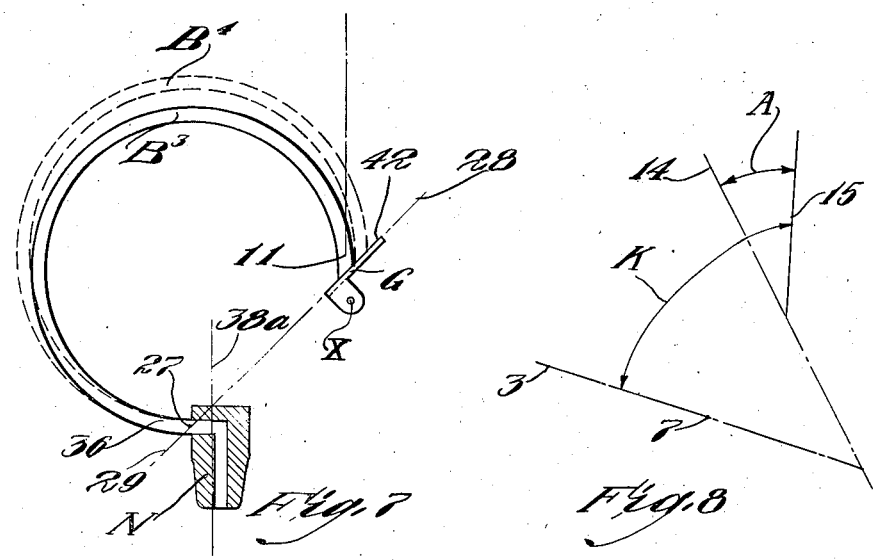
Inventor
Francis L. Fahy
by Roberts Cushman & Grover
Att'ys.

Patented July 26, 1949

2,477,242

UNITED STATES PATENT OFFICE 2,477,242

METHOD OF MAKING BOURDON TUBE INSTRUMENTS

Francis L. Fahy, Bridgeport, Conn., assignor to Manning, Maxwell & Moore, Incorporated, New York, N. Y., a corporation of New Jersey Application July 8, 1946, Serial No. 682,113

5 Claims. (Cl. 29—148)

1

This invention relates to Bourdon tube instruments and more especially to a method of making such instruments. In an instrument of this kind, the Bourdon tube (which is a length of flattened stiffly resilient tubing closed at one end and bent to approximately circular curvature and of approximately 270° of arc) flexes in response to internal pressure variations. The resultant movement of its free end or tip (the opposite end being fixed) is transmitted by the "movement mechanism" to an index (usually a pointer mounted on a rotary staff) which cooperates with a graduated dial to indicate the variations in pressure within the tube. However, it is very difficult to manufacture Bourdon tubes which are accurately alike (with respect to finished dimensions and response to internal pressure variations). Moreover, the translation of the tube tip movement into motion of the index along the dial, so as to insure equal travel of the index (over the entire scale) in response to equal increments of pressure, is attended with very considerable difficulty. When dials were graduated, each individually with respect to its associated Bourdon tube, this difficulty could be overcome, at least to a major extent, by marking the dial to correspond to the position of the index at each different pressure, but when pre-graduated dials (made by an appropriate duplicating process) are used, the only practical method heretofore available for insuring accuracy of indication involves a slow and skilled calibration of the instrument after assembly of its parts which adds very substantially to the cost of manufacture.

The principal object of the present invention is to provide a novel method of making a Bourdon tube instrument thereby the amount of required calibration after assembly of the instrument is reduced to a minimum. A further object is to provide a method of making Bourdon tubes whereby the effects of slight variations in the finished dimensions of the tubes are substantially nullified. A further object is to provide a method of making Bourdon tube instruments such that the accurate location of the free end or tip of the unstressed tube and the proper direction of travel of the tip in response to pressure variations is assured.

The principle of the invention and certain desirable embodiments of this principle are illustrated diagrammatically in the accompanying drawings wherein Fig. 1 is a diagrammatic front elevation, showing a conventional geometric layout of a Bourdon

2 tube instrument, such for example as a pressure gauge or thermometer;

Fig. 5 is a diagram illustrating a slightly different procedure in accordance with the present invention;

Fig. 6 is a diagrammatic front elevation showing the practical application of the procedure illustrated in Fig. 5;

Fig. 7 is a diagrammatic front elevation, partly in section, showing the step of uniting the tube to the tip bracket and to its support; and Fig. 8 is a diagram illustrating certain relations between the factors involved.

Owing to the "spring-back" of the resilient metal employed, it is difficult by production methods, as above noted, to make Bourdon tubes which are accurately alike as to radius of curvature; it is likewise difficult to make tubes which respond in exactly the same way to the same pressure differential, in other words, to make tubes whose tips travel in the same direction and to the same extent in response to a given range of pressure change.

However, it is an accepted fact that the angle between the tangent to the free end portion or tip of the tube and the line of direction of travel of the tube tip is a function of the arcuate length of the effective portion of the tube. This relation is made use of in accordance with the present invention in such a way as to eliminate most of the difficulties heretofore experienced in the production of accurate instruments.

In utilizing this principle, advantage is taken of the fact that by geometric methods, assisted in certain particulars by trial and error, it is possible to design an arrangement of the constituent parts of the movement mechanism (including the length of the motion-transmitting link) which, for a Bourdon tube having known characteristics, results in optimum accuracy. Thus by accurate location of the tube tip, and by insuring the movement of the tube tip in a predetermined direction, it becomes practically possible to make instruments upon a production basis which are acceptably accurate with a minimum of necessary calibration.

Specifically and as one solution of the problem, the tube, after bending, is cut to a predetermined arcuate length. The tip of the tube is then located accurately (at a predetermined point) with reference to the axis of the index staff and the opposite end of the tube is so fixed that the tangent to its free end is oriented to a predetermined angle.

Figures 1, 2:
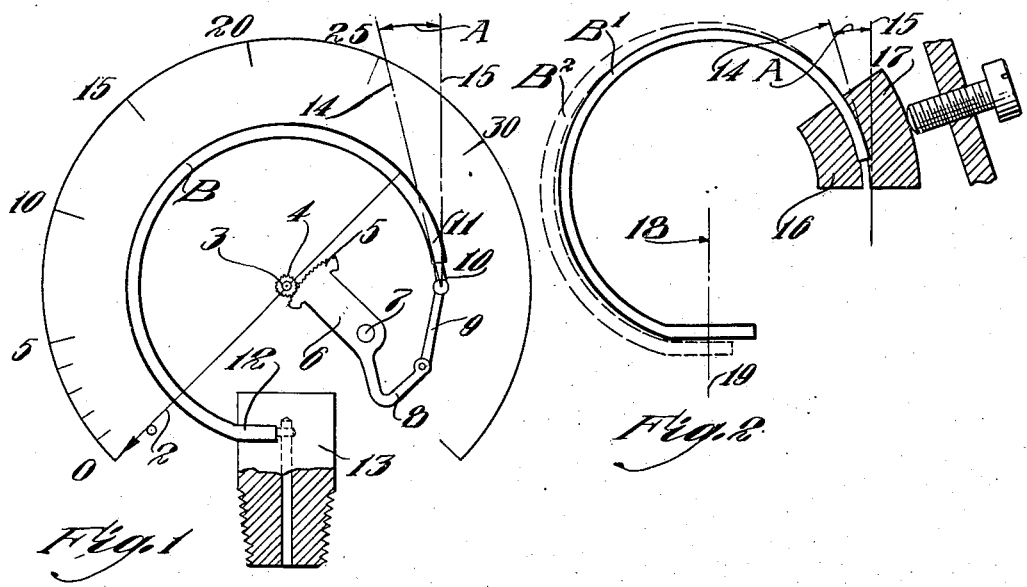
Fig. 2 is a diagrammatic front elevation illustrating the step of cutting Bourdon tubes to uniform predetermined arcuate lengths in accordance with the practice of the present invention.

In Fig. 1 the essential parts of a Bourdon tube instrument and their geometrical relation are diagrammatically indicated. In this view there is indicated a dial, graduated for example to a uniform scale, and which cooperates with a pointer or index 2 mounted on a rotary staff 3 and which customarily swings through an arc of 270° over the scale. The staff is provided with a pinion 4, which meshes with a segment gear 5 carried by a lever 6 mounted on a rotary staff 7 and having a tail piece 8 which is connected by a link 9 to the tip bracket 10 of the Bourdon tube B whose free, closed end 11 carries the tip bracket and whose opposite end 12 is fixed to a support 13 and whose interior communicates with a capillary tube or other conduit for transmitting pressure to the interior of the tube. The arcuate length of the curved portion of the tube B, when in the unstressed condition, as herein illustrated by way of example, is approximately 270°, (although it may be of other arcuate length) the tangent to the free end or tip 11 of the unstressed tube being indicated by the line 14 and the path of travel of the tip, as the internal pressure increases, being indicated by the line 15, the angle between these two lines being designated by the letter A.

The geometric layout, which permits accurate and easy calibration of the instrument with respect to a predetermined dial layout, for instance a uniformly graduated dial, is quite readily determined, assuming that the direction of tip travel is definite and that the minor departures from theoretically correct tube curvature, due to manufacturing inaccuracies, may be neutralized. This geometric relation involves the distance between the axes of the staffs 3 and 7, the effective length of the tail piece 8, the length of the link 9, and the exact location of the tip of the unstressed tube, as referred, for example, to its distance from the axes of the staffs 3 and 7, and the direction of the path of travel 15 of the tube tip as referred, for example, to a line joining the axes of the staffs 3 and 7. The effective length of the tail piece 8 is varied in accordance with variations in the length of tip travel.

Herein when reference is made to the tube tip it is to be understood that the axis of the pivot which unites the link 9 to the free end of the tube is to be considered as the tube tip, although this pivotal axis in practice is usually located in the bracket 10 which is not a part of the tube proper, but which is fixed to the latter.

The method of locating the several parts above described is familiar to those skilled in the art, and forms no essential part of the present invention. However, in order to build instruments by production methods, which do not require excessive calibration when using predetermined dial layouts, the method of manufacture must be such as in each instance to insure the proper initial tip position and the proper direction of tip travel upon which the geometrical layout is based. As above pointed out, the present invention achieves this result by reference to the fact that there is a definite relation between the arcuate length of the Bourdon tube and the angle A between the tangent 14 to the tube tip, and the direction 15 of tip travel. Thus if the tube be cut to a determined arcuate length, and if the tip end of the tube be mounted so that its tangent 14 is at a definite angle referred to the geometrical layout, the direction 15 of tip travel will also make a definite angle K (Fig. 8) with respect to factors of this geometrical layout, for instance with reference to a line joining the axes of the staffs 3 and 7, it being understood that in mounting the Bourdon tube its free end or tip will be accurately located with respect, for example, to the axis of the staff 7.

Figures 3, 4:
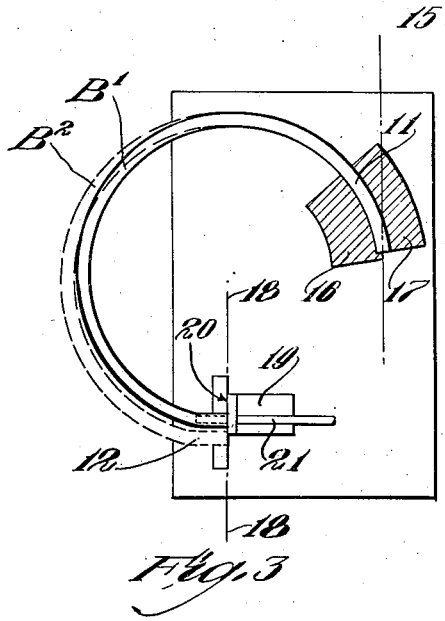
Fig. 3 is a diagrammatic front elevation showing how the tube, after being cut to proper length, is fixed to a bracket member.
Fig. 4 is a diagrammatic front elevation showing the tube with its bracket member assembled with other parts of the instrument.

Referring to Figs. 2, 3 and 4, the characters $B^1$ and $B^2$ indicate Bourdon tubes of slightly different radii of curvature representing in this respect (but greatly magnified) differences in radius, for example, within a range of the order of one-eighth inch, which may be expected in tubes made by present commercial methods but intended to have the same radius and intended for use in a given instrument. It will be obvious that the intended radius of the tube is determined by the available space within the case of the instrument which is to be made, and will thus depend upon the size of the case as a whole, the design of the movement mechanism, and the possible presence of other devices within the same case. In accordance with one mode of procedure in the attainment of the objects of the present invention, the free end portion 11 of the selected tube is clamped between fixture jaws 16 and 17 (Fig. 3) which substantially conform to the curvature of the ideal tube and thus determine the location of its center of curvature. The opposite end 12 of the tube, that is to say, that end which is to be fixed to the mounting bracket, is now cut off along a line 18—18 parallel to the direction 15 of tip travel and passing through the center of curvature of the tube. A mounting bracket 19 is provided having a flat surface 20 for contact with the cut end of the tube, and this surface 20 of the bracket is now caused to register with the line 18—18 and the cut end of the tube is soldered or otherwise permanently secured to the bracket 19. This bracket is provided with an opening which communicates with the interior of the tube when the end 12 of the tube has been fixed in place, and a capillary tube 21 or other conduit is sealed in the opening and is arranged to supply pressure fluid to the interior of the Bourdon tube. In the final assembly of the tube (Fig. 4) with the gauge parts, the bracket 19 is mounted upon the support S for the gauge movement, with the surface 20 disposed accurately parallel to the intended direction 15 of tip travel, and the bracket 19 is then permanently fixed to the support S by welding, soldering or the like. In this description it is to be understood that the support S is representative of any frame member which carries the movement mechanism, and that the bracket 19 is representative of any customary support for the fixed end of the tube.

Referring to Figs. 5, 6 and 7, a second mode of procedure in accordance with the present invention is illustrated. Thus referring to Fig. 5, the characters $B^3$, $B^4$ and $B^5$ indicate Bourdon tubes of different radii of curvature, thus representing the differences (much magnified) in tube diameter which are met with in the commercial practice of gauge making. Those ends of these tubes which are to be secured to the fixed support, are indicated as located at the common point 27, while the free ends of the tubes are spaced apart due to the differences in tube diameter. When thus arranged, a line, such as the line 28—29, passing through the point 27 and through the tube tips 30, 31 and 32, cuts off lengths of the several tubes which are of the same arcuate length, that is to say, of the same number of degrees of arc. With the understanding that each of the tubes is of the same degree of arc, the direction of travel of the several tube tips may be represented by the parallel lines 33, 34 and 35, respectively. In the particular instance illustrated these lines are perpendicular to those radii of the respective tubes which extend from the centers 22, 23 and 24 of the respective tubes, to the tube tips 30, 31 and 32, respectively. Upon the basis of the above relationships, the procedure, in accordance with the present invention, is illustrated from the practical standpoint in Figs. 6 and 7. Thus, for example, referring to Fig. 6, and assuming that either one or the other of tubes B³ or B⁴ is the one selected, the end 36 of the selected tube (which is to be the fixed end) is arranged in a fixture comprising stop members 37 and 37ª, the latter having a vertical surface 38 and the end 36 of the tube being butted against this surface 38. In the arrangement illustrated, the direction of tube travel (indicated by the line 33) for the selected tube B³ is parallel to the surface 38. The right-hand end of the selected tube B³ is then trimmed off along the line 28—29 (the angle which this line makes with the surface 38 being the same in trimming all tubes, thus assuring the production of tubes, regardless of radius variation, which are all of the same arcuate length). An internal support for the tube may be provided. Preferably this support has tube-engaging rolls 39 and 40 carried by a vertically slidable member which is urged upwardly by a spring. However, the strength of this spring is insufficient to produce any appreciable deformation of the tube. During the cutting, the tube, whose end 36 is still accurately positioned by the fixture, is held immovable by any suitable means, for instance by clamping plates applied to opposite faces of the tube. A tube tip bracket G (Fig. 7) is provided, having an elongate flat surface 42 and having the opening X for the reception of the pivot pin by means of which the bracket is secured to the transmitting link 9 (Fig. 1). This bracket G is now moved (with its surface 42 in the line 28—29) until the axis of the pivot opening X occupies the proper relation to the other parts of the movement mechanism in accordance with the geometric layout of Fig. 1. The tube tip is now permanently secured to the bracket G by solder or similar means, the bracket G being held firmly in position by an appropriate fixture while this operation is being carried out.

Obviously, instead of moving the bracket G relatively to the tube tip, the tube tip might first be fixed to the bracket and the opposite end 36 of the tube properly adjusted relatively to its supporting bracket, for example, the nipple N, before attaching it to the latter, it being understood that in the latter event the support N will have an extended surface in the line 38ª (parallel to the line 33) for contact with the end of the tube.

It is thus evident that the invention may be carried out in various specific ways, the principal and most essential feature being that in accordance with this procedure the direction of tip travel remains parallel to a direction which has been predetermined in the geometrical layout, or in other words, the radius from the center of any given tube to its tip must be parallel to a predetermined direction in the geometrical layout, and assembly.

Obviously, the tubes employed in making a given size and style of instrument will be selected from tubes such as are prepared by customary commercial practice for use in instruments of the desired size and style, and will differ from each other only within a range of difference herein referred to as the permissive range, such as results from imperfection in manufacture, by commercial methods, of tubes designed to be substantially alike in dimensions in response to internal pressure variations.

I claim:

1. That method of making Bourdon tube instruments having uniformly graduated dials and employing Bourdon tubes made by production methods such that tubes of the same intended radius of curvature differ from one another in actual radius, said method comprising as steps determining, by known procedures, the correct geometrical layout for the particular size and style of instrument to be made, including the proper location of the tube tip, the proper direction of travel of the tube tip and the theoretically correct radius of Bourdon tube for use in the particular instrument to be made, cutting all of the tubes accurately to the same arcuate length by providing a fixture having means for locating one end of the tube so that the center of curvature of a tube mounted therein is properly positioned in accordance with the geometric layout, mounting one end of the tube in said fixture, rigidly holding the tube while cutting the opposite end of the tube in a plane bearing a definite relation to the direction of the tip travel as determined by the geometric lay-out, the plane of cut being the same for all tubes, and permanently securing a bracket to the cut end of the tube.

2. That method of making Bourdon tube instruments having pregraduated dials and employing Bourdon tubes made by production methods such that tubes of ostensibly the same radius of curvature differ from one another in actual radius within a range of the order of one-eighth inch, said method comprising as steps determining, by known procedures, the correct geometrical layout for the particular size and style of instrument to be made, including the proper location of the tube tip, the proper direction of travel of the tube tip and the theoretically correct radius of Bourdon tube for use in the particular instrument to be made, providing means for positioning one end of the tube which has been selected for use so that the center of curvature is properly located with reference to the geometric layout, mounting one end of the tube in said positioning means, holding the tube stationary while so positioned and, while so holding it, cutting off material from its other end in a plane which bears a definite relation to the direction of tip travel as defined by the geometric layout thereby to provide a tube of accurately predetermined arcuate extent, and permanently attaching a bracket member to the cut end of the tube.

3. That method of making Bourdon tube instruments having uniformly graduated dials and employing Bourdon tubes made by production methods such that tubes of the same intended radius of curvature differ from one another in actual radius within a range of the order of one-eighth inch, said method comprising as steps determining, by known procedures, the correct geometrical layout for the particular size and style of instrument to be made, including the proper location of the tube tip, the proper direction of travel of the tube tip and the theoretically correct radius of Bourdon tube for use in the particular instrument to be made, providing tubes by production methods of ostensibly the correct radius of curvature but which in fact differ slightly in radius, accurately cutting each tube to the same arcuate length and, in assembling a given tube with the other parts of the instrument, disposing the free tip of the tube at the exact location determined by the geometrical layout, and permanently fixing the opposite end of the tube to a rigid supporting member.

4. That method of making Bourdon tube instruments having uniformly graduated dials and employing Bourdon tubes made by production methods such that tubes of the same intended radius of curvature differ from one another in actual radius, said method comprising as steps determining, by known procedures, the correct geometrical layout for the particular size and style of instrument to be made, including the proper location of the tube tip, the proper direction of travel of the tube tip and the theoretically correct radius of Bourdon tube for use in the particular instrument to be made, cutting all of the tubes accurately to the same arcuate length by so positioning and rigidly holding that end of the tube which is to be the free end that the center of curvature of the tube is properly positioned as determined by the geometrical layout, cutting the opposite end of the tube along a line parallel to the direction of tip travel as determined by the geometrical layout, providing a mounting bracket having a substantially flat face, disposing said face in a plane parallel to the direction of the path of tip travel and at the same distance from the latter as the plane of cutting, contacting the cut end of the tube with said bracket surface and permanently fixing it thereto, disposing the tube tip at the proper location as determined by the geometrical layout, and permanently fixing the mounting bracket relatively to the support for the movement mechanism.

5. That method of making Bourdon tube instruments having uniformly graduated dials and employing Bourdon tubes made by production methods such that tubes of the same intended radium of curvature differ from one another in actual radius, said method comprising as steps determining, by known procedures, the correct geometrical layout for the particular size and style of instrument to be made, including the proper location of the tube tip, the proper direction of travel of the tube tip and the theoretically correct radius of Bourdon tube for use in the particular instrument to be made, and cutting all of the tubes accurately to the same arcuate length by providing a fixture for positioning that end of the tube, which is to be the fixed end in the completed instrument, so that the center of curvature of the tube is properly located in accordance with the geometrical layout, placing one end of the tube in the fixture and rigidly holding it while cutting off material from its opposite end, the plane of cutting being the same in cutting each tube and passing through the position of the tube tip as determined by the geometric layout, providing a tip bracket having an extended flat surface and means defining the pivotal axis for a motion-transmitting link, disposing the bracket so that said axis is at the proper location as determined by the geometric layout, contacting said flat surface of the tip bracket with the cut end of the tube, and permanently securing the tube to the bracket.

FRANCIS L. FAHY.

REFERENCES CITED

The following references are of record in the file of this patent:

UNITED STATES PATENTS

| Number | Name | Date |
|---|---|---|
| 1,797,324 | Carliss | Mar. 24, 1931 |
| 1,894,153 | Brietzke | Jan. 10, 1933 |